Dec. 17, 1929.　　　F. A. RUTTY　　　1,739,988
SEATING CHART
Filed May 4, 1928
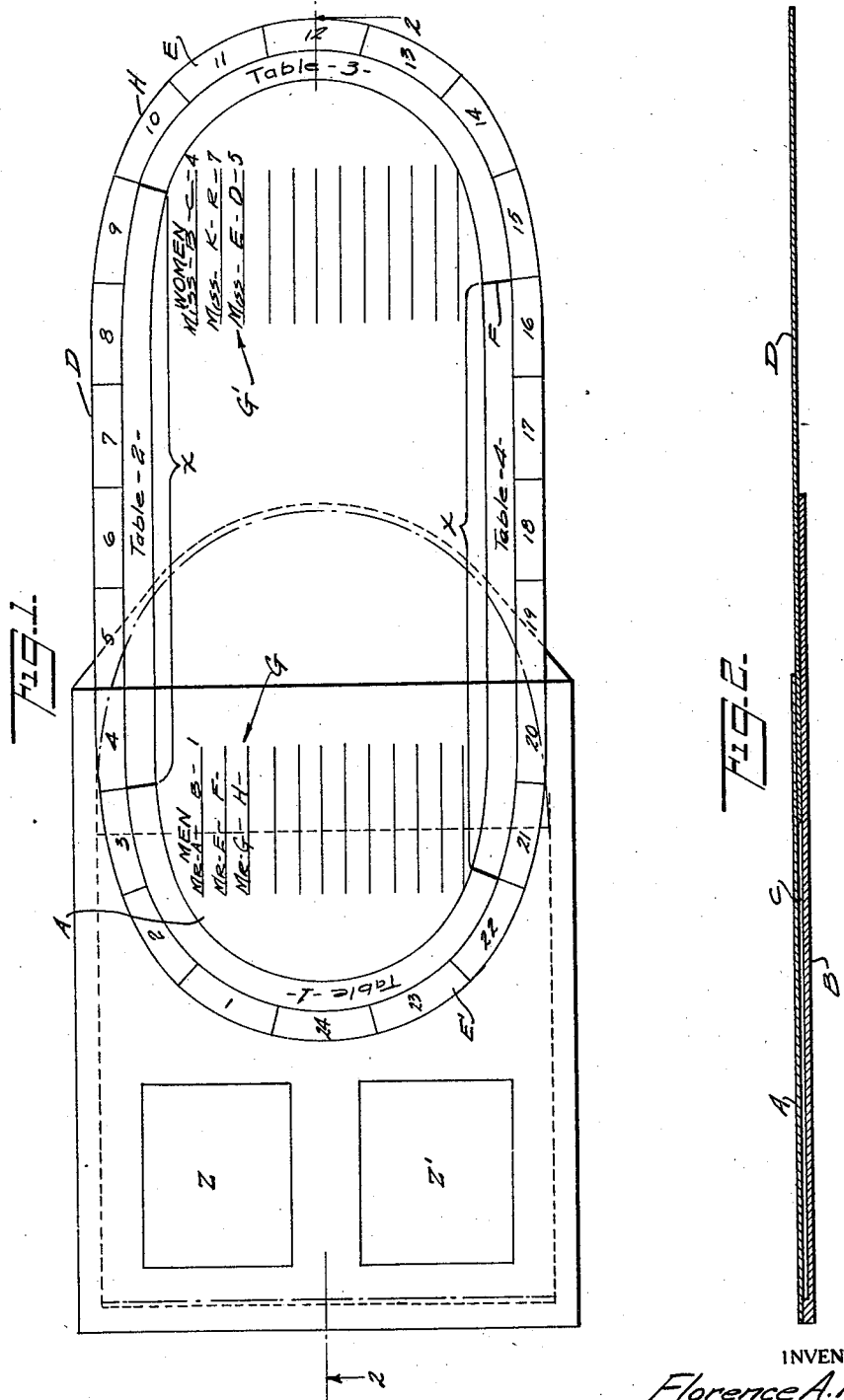
INVENTOR
Florence A. Rutty.
BY
ATTORNEY Patented Dec. 17, 1929

1,739,988

UNITED STATES PATENT OFFICE

FLORENCE A. RUTTY, OF NEW YORK, N. Y.

SEATING CHART

Application filed May 4, 1928. Serial No. 275,037.

This invention relates to means for enabling a host or hostess to rapidly and conveniently arrange the assignment of seatings of the guests for a dinner or luncheon so as to bring congenial people together at the table, to facilitate the correct seating of the guests when they go to the table, and to obtain a temporary record of such seatings. To this end it comprises a chart made of a material on which pencil marks can be traced and erased (said chart being preferably of telescoping construction) and having border divisions representing seatings permanently marked and distinctively numbered thereon (preferably consecutively) together with parallel lined spaces permanently marked on the face of the chart, in which latter the names of guests may be written in pencil with the number of the seating selected for each.

The best form of article at present known to me, embodying my invention, is illustrated in the accompanying sheet of drawings in which Fig. 1 is a face view of a telescoping form of the chart, and Fig. 2 is a cross section on line 2—2 of Fig. 1.

Throughout the drawings like reference characters indicate like parts.

In the form of the article here shown A is a section of thin celluloid or cardboard sheet having a backing portion B attached to it along the edges on three sides so as to form a pocket C open at the right hand end. D is a similar section of the same material and of the same general shape, but enough narrower to telescope into the pocket C.

The latter section or sheet D may have its protruding end curved in semicircular form, as shown at H, and has a series of spaces or divisions E, permanently marked around its protruding border portion to represent seatings for a party of guests along the corresponding portions of a dinner table constituting the right hand portion of such table. The other section A has a curved series of similar sections or divisions E', permanently marked thereon to complete the representaton of a loop indicating the outline of the entire table when associated with the telescoping section D, as shown in Fig. 1.

Each of these divisions, or border spaces, has an identifying character forming a series such as the consecutively arranged numerals shown, which are permanently marked thereon. Preferably the numbers on the two sections together are arranged to run consecutively around the chart when the same is completely extended, as shown in full lines in Fig. 1. The whole number of sections E and E' may be sub-divided into subseries such as X, X, each of a lesser number, by permanent sub-division markings, as shown at F. These are to be used if the guests are to be seated at a number of small tables, instead of at one long table such as would be represented by the chart when more or less extended. These groups may be associated with permanent identifying marks such as "Table 1", and "Table 2", &c.

On the face of one or of both of the sections A and D are permanently marked a series of parallel lines in columns, as shown at G, G'. These columns may also be headed "Men" in one case, and "Women" in the other, as shown, and the names of the men and women among the guests segregated accordingly.

Z represents printed directions for use of the chart and Z' represents advertising matter, either or both of which may be permanently printed upon otherwise unused portions of either face of the chart.

In using the invention, the chart could be telescoped, as indicated in broken lines, until the number of seatings so left exposed corresponded to the total number of guests in the party, and the names of the guests then written on the parallel lines G, G', arranged in columns, the men's names being generally placed in one column, as that headed G, and the women's names in another, as G'. The hostess can then conveniently assign each guest, whose name appears in one or the other column to a given seating, or place at the table, so as to bring congenial people together by writing the number of the selected seating opposite the name of each guest. The chart can then be handed to the butler or other person who is to lay the usual set of name cards at the respective plates to serve as a guide in placing said cards around the table. The person doing this can then look in the lists G and G' for each name, as it appears on the uppermost card in the pack, read the seating number of that guest therefrom and place the card at the plate corresponding to the marginal chart space so numbered.

According to another method of use, the proper seating number for a given guest whose name is on a card, as taken from the list G or G', may also be placed on each card and in that case the butler will not have to look at the list at all, but merely locate the table seatings by consulting the numbers on the chart margin E, E' and selecting the corresponding card.

Another method of use of the invention would be to have a number of these charts of small size for distribution among the guests and then merely have the butler place numbered cards about the table at the places corresponding to a copy of the chart which would be handed him. Each guest by means of the chart could then at once locate his or her seating at the table by reference to the chart and find it easily, without having to walk around and examine a lot of place cards before locating the seating. Permanently numbered place cards could be used and in this way a set of charts embodying my invention and one set of place cards could be used for successive dinners or luncheons without requiring the writing of a fresh set of place cards for each occasion.

It is understood, of course, that the charts are made of celluloid or other material on which names and numbers can be written with a pencil, or other agency easily erased so that the charts can be used over and over again.

In the drawings the chart markings have been made up on the assumption that in the case of the use of a series of small tables no more than eight guests would be placed at any such small table. If a lesser number are to be seated at each, or certain of the tables only, a corresponding number of the numerals in each sub-division X would be used in making up the list.

The telescoping sheet section D should fit into the pocket C in the other section closely enough to frictionally hold it in any given adjustment therein.

The advertising matter Z' might relate to to the business of a caterer, or of a dealer in table ware, who could have the charts made up in quantity and distributed gratis among actual and prospective customers for advertising purposes.

Various changes could be made in the details of construction above described and illustrated in the drawings without departing from the underlying principle and general mode of operation of the invention herein set forth. Also some of the sub-combinations of features here shown and described could be used without others, if simpler and cheaper articles embodying some, but not all, of the suggested advantages of the complete invention were desired.

Having described my invention, I claim:

As a new article of manufacture, a seating chart for dinner and luncheon parties which comprises, in combination, two telescoping sheet sections each made of material on which lead pencil marks may be traced or erased and having curved outline portions which, when said sections are assembled, form the outline of a closed loop, said outline portions being provided with evenly spaced and consecutively numbered divisions, each representing a seating for a guest, and the interior portions of the face of one section having parallel lined spaces in which the names of a list of men guests may be written and the other section having similarly lined spaces in which the names of women guests may be written; whereby said chart may be partially telescoped to leave exposed the number of seatings required for a party of a given number, and the names of the guests written on the lines in the proper column together with their respective seat numbers as the latter are selected by the hostess to arrange adjacent seatings.

FLORENCE A. RUTTY.